United States Patent
Abe

(10) Patent No.: US 6,677,403 B1
(45) Date of Patent: Jan. 13, 2004

(54) PROPYLENE RESIN COMPOSITION

(75) Inventor: Kazuto Abe, Oita (JP)

(73) Assignee: Basell Polioefine Italia S.p.A., Milan (IT)

( * ) Notice: Subject to any disclaimer, the term of this patent is extended or adjusted under 35 U.S.C. 154(b) by 0 days.

(21) Appl. No.: 09/913,387

(22) PCT Filed: Dec. 12, 2000

(86) PCT No.: PCT/EP00/12611

§ 371 (c)(1),
(2), (4) Date: Aug. 13, 2001

(87) PCT Pub. No.: WO01/44366

PCT Pub. Date: Jun. 21, 2001

(30) Foreign Application Priority Data

Dec. 14, 1999 (JP) .............................. 11-354974

(51) Int. Cl.⁷ .......................... C08L 23/00; C08L 23/04; C08L 25/02; C08L 9/00
(52) U.S. Cl. ...................... 525/191; 525/232; 525/240; 525/241
(58) Field of Search ................................ 525/191, 232, 525/240, 241

(56) References Cited

U.S. PATENT DOCUMENTS

| | | | |
|---|---|---|---|
| 5,237,859 A | 8/1993 | Elings et al. | |
| 5,473,016 A | 12/1995 | Fujii et al. | 525/74 |
| 5,543,454 A | 8/1996 | Kamakura et al. | 524/451 |
| 5,703,172 A | * 12/1997 | Watanabe et al. | 525/232 |
| 5,916,990 A | 6/1999 | Yanagihara et al. | 526/351 |
| 6,184,328 B1 | 2/2001 | Yanagihara et al. | 526/351 |

FOREIGN PATENT DOCUMENTS

| | | |
|---|---|---|
| JP | 58168649 | 10/1983 |
| JP | 1149845 | 6/1989 |
| JP | 3172339 | 7/1991 |
| JP | 7053828 | 2/1995 |
| JP | 9071712 | 3/1997 |
| JP | 11189699 | 7/1999 |
| WO | 9531490 | 11/1995 |
| WO | 9839385 | 9/1998 |
| WO | 0024816 | 5/2000 |

OTHER PUBLICATIONS

Webster's II New Riverside University Dictionary, Houghton Mifflin Company, Boston, MA © 1988, p. 872.*
R. Zallen et al., Physical Review B, 4(12): 4471–4479 (1971).
Macromolecules, 6(6): 925–926 (1973).
Macromolecules, 8(5): 687–689 (1975).
Y. Nishimura et al., Nippon Kikai Gakkai Zairyo Rikigaku Koenkai Koen Yokoshu, No. 900–86, pp. 673–675 (1990).
Y. Nishimura et al., Proc. of the Japan Society of Mechanical Engineers, vol. A, No. 910–17, pp. 19–21 (1991).
T. Odagaki, Science of Percolation, Shokabo, 7: 61–71 (1993).
H. Hasegawa et al., Macromolecules, 20: 1651–1662 (1987).
S. Igarashi, Jikken Butsurigaku Koza, Onkyo to Shindo, No. 2752, pp. 226–229; (Oct. 1, 1968).

* cited by examiner

*Primary Examiner*—Nathan M. Nutter

(57) ABSTRACT

A propylene resin composition which is improved in performance of properties, which has a uniform structure, which is high in mechanical strengths and which is excellent in heat resistance, rigidity, impact resistance, moldability and the like, containing a propylene resin and an elastic material, which composition is provided by a specific morphology that the separated micro phase structure of a specific elastic material present in a propylene resin composition as measured by an acoustic microscope has a percolation structure.

4 Claims, 1 Drawing Sheet

Am

PROPYLENE RESIN COMPOSITION

This application is the U.S. national phase of International Application PCT/EP00/12611, filed Dec. 12, 2000.

The present invention relates to a propylene resin composition. More specifically, it relates to a propylene resin composition having an improved performance of its properties and an excellent moldability.

A propylene resin composition made of a propylene resin and an elastic material typified by an elastomer has advantages that it is less costly, has high mechanical strengths, and is high in temperatures which can be used and excellent in chemical resistance, electrical insulating properties and the like. Thus, it is useful for a wide variety of application areas such as films, sheets, foams, blow-molded products, injection-molded products and the like. In any application, however, there are limitations in its properties. Especially, the limitations in a heat resistance, a rigidity and an impact strength are unveiled, because those of the propylene resins inferior to those of amorphous resins such as impact-resistant polystyrene, acrylonitrile-butadiene-styrene resin (ABS), polycarbonate (PC)/ABS and the like. Accordingly, the field in which it can be used is limited. Thus, it would be highly desirable to eliminate the disadvantages, some proposals have been made to date. For example, for improving the same, various polypropylene resin compositions have been proposed which are obtained by adding to polypropylene an elastic material having a low Young's modulus with which to absorb impact and by adding reinforcing materials such as inorganic fillers to enhance a heat resistance or a rigidity (Japanese Patent Laid-Open Nos. 168,649/1983 and 172,339/1991).

As the elastic material, for example, low-density polyethylene, high-density polyethylene, an ethylene-propylene copolymer rubber, an ethylene-butene copolymer rubber, a copolymer rubber of a material containing ethylene and $C_2$–$C_{20}$ olefin or at least two of these $C_2$–$C_{20}$ olefins, a crystalline ethylene-propylene block copolymer obtained by multi-stage polymerization, and, as a copolymer other than olefin series, a block copolymer containing an ethylene chain segment or a hydrogenated butadiene chain segment and a chain of styrene, methyl methacrylate, vinyl acetate or vinyl chloride or a chain segment of at least two types of copolymers, such as a styrene-ethylene-butylene-styrene diblock copolymer which is produced from polystyrene-block-butadiene-block-styrene), have been proposed for the purpose of the improvement of polypropylene. For example, Japanese Patent Laid-Open No. 149,845/1989 discloses a propylene resin composition made of (a) 59 to 74% by weight of a propylene-ethylene block copolymer containing 5 to 12% by weight of a boiling xylene soluble matter with an ethylene content of 20 to 60% by weight, having an ethylene content of the overall polymer of 1 to 7% by weight and having a melt flow rate of 15 to 50 g/10 minutes, (b) 35 to 20% by weight of an ethylene-propylene copolymer rubber having a propylene content of 20 to 60% by weight and having a Mooney viscosity $ML_{1+4}$ (100° C.) of 100 to 150 and (c) 3 to 6% by weight of talc having a specific surface area of 30,000 $cm^2$/g or more and an average particle diameter of 0.5 to 2.0 μm. Although an impact resistance is satisfactory, an amount of an ethylene component having a low heat resistance is large. Thus, it can hardly be said that the improvement is satisfactory in view of the heat resistance and the rigidity. Moreover, when such a propylene resin composition is transformed into products by injection molding, the products sometimes have notably bad surface aspect problems which are called flow mark (tiger mark), whose tangential striped pattern is caused by alternately gloss difference repeating between high and low sections.

In order to solve the problems, Japanese Patent Laid-Open Nos. 53,838/1995 (corresponding U.S. Pat. Nos. 5,543,454) and 71,712/1997 disclose a propylene resin composition in which a molecular weight of a homopolypropylene moiety is decreased and a molecular weight of a propylene-ethylene block copolymer rubber, a p-xylene soluble fraction which is extracted from a crystalline ethylene-propylene copolymer at 23° C. is increased. Although the flow mark of this propylene resin composition is reduced, the high-molecular portion easily forms a sparingly plastic agglomerate (gel fish-eye or the like) which appears as an acne on the surface of the molded product. Consequently, not only is the appearance worsened, but also defective points in which the impact resistance is heavily decreased owing to non-uniformity by the acne are generated in some cases.

Further, Japanese Patent Laid-Open No. 189,699/1999 in which for solving the problems, an elastic material made of a styrene-ethylene-butylene-styrene (hereinafter abbreviated as "SEBS") block copolymer for which a high molecular weight is not indispensable is used and a b-axial orientation structure of a crystalline polypropylene moiety is limited for maintaining a heat resistance and a rigidity discloses a polypropylene resin composition comprising (A) 54 to 65% by weight of a crystalline ethylene-propylene block copolymer having MFR of 60 to 120 g/10 minutes, the homopolypropylene moiety having an isotactic pentad ratio of 96% or more and MFR of 150 to 250 g/10 minutes, and the content of the ethylene-propylene copolymer moiety being 5 to 10% by weight, (B) 17 to 24% by weight of a thermoplastic elastomer comprising one or more types of styrene-ethylene-butylene-styrene block copolymers, and (C) 15 to 25% by weight of talc, the mechanical properties measured according to ASTM being as follows, flexural modulus≧1,800 MPa
tensile yield strength≧20 MPa
23° C. Izod impact strength≧180 J/m
−30° C. Izod impact strength≧30 J/m
Rockwell hardness (R scale)≧74
heat distortion temperature (HDT 18.5 kg)≧73° C.
brittle temperature≧−20° C.
MFR=40 to 60 g/10 minutes and the degree of b-axial orientation calculated from the differential peak intensities measured by the wide angle X-ray diffraction in the vicinity of the center of ASTM #1 dumbbell formed by injection molding being 720 or more. However, the styrene-ethylene-butylene-styrene block copolymer used to obtain the necessary impact resistance is quite expensive in comparison with olefinic elastic materials, and added in the large amount, inviting the increase in cost and the decrease in rigidity. Moreover, since the styrene.ethylene.butylene.styrene block copolymer is not so good in heat resistance, the talc content is relatively increased. Thus, the uniformity tends to decrease. Accordingly, it is hardly said that in the propylene resin composition disclosed, the heat resistance, the rigidity and the impact resistance are balanced at a high level.

Under these circumstances, the problems of the invention are to provide, at low costs, a propylene resin composition in which no flow mark is generated and no acne formed from an agglomerate of a high-molecular substance is generated, which has a uniform structure as a whole, which is therefore so excellent in moldability as to be able to provide a molded product having an excellent appearance, which is markedly improved in balance of properties compared with ordinary polypropylene materials, which is high in mechanical strengths and which is excellent in rigidity, heat resistance, impact resistance, moldability and the like.

In order to solve the problems, the present inventors have studied various elastic materials which are a constituent of the propylene resin composition of the invention and various separated micro phase structures of elastic materials intended. Consequently, they have found that a propylene resin composition excellent in rigidity, heat resistance, impact strength, moldability and the like is obtained when it is a propylene resin composition in which an elastic material present in the propylene resin composition is a component having a velocity v of sound propagated as a longitudinal wave being 3,000 m/s or less and a separated micro phase structure of the elastic material in the propylene resin composition as identified by ultrasonic measurement, a force modulation method with an atomic force microscope or the like has a percolation structure in which the elastic material is infinitely continuous in the resin solid space. This finding has led to the completion of the invention.

That is, the gist of the invention is a propylene resin composition comprising a propylene resin and an elastic material, characterized in that the elastic material present in the composition has a velocity v of sound propagated as a longitudinal wave being 3,000 m/s or less, and a separated micro phase structure of the phase of elastic material in the composition has a percolation structure in which the elastic material is infinitely continuous in the resin solid space.

The invention is described in detail below.

First, the propylene resin contained in the propylene resin composition of the invention is a crystalline propylene resin which is a propylene homopolymer or a copolymer of propylene and another α-olefin (up to approximately 20 carbon atoms) such as ethylene, butene-1 or the like. The content of the α-olefin in these copolymers is preferably 10 mol % or less. Specifically, a material containing isotactic polypropylene having a high stereoregularity is preferable. In this isotactic polypropylene, the isotactic pentad ratio (IP) as measured by $^{13}C$ nuclear magnetic resonance spectroscopy is preferably 95.0% or more. More preferably, the isotactic pentad ratio (IP) is 98.0% or more. This IP is measured by the method described in Macromolecules, vol. 6, p. 925 (published 1973). That is, IP refers to an isotactic ratio in a pentad unit in succession of the propylene polymer chain as measured using a nuclear magnetic resonance spectrum ($^{13}C$-NMR) with isotopic carbon. Incidentally, IP referred to in the invention is a measured value of polypropylene after xylene extraction. With respect to the assignment of the peak, IP was measured with mmmm peak intensity fraction in the overall absorption peak of a methyl carbon region in the $^{13}C$-NMR spectrum according to the reversed version of the above-described literature described in Macromolecules, vol. 8, p. 687 (published 1975). Regarding the xylene extraction here, the polymer is a polymer insoluble in xylene at 25° C. Specifically, it is a polymer which may be obtained by dissolving o-xylene of 135° C. and then precipitating at 25° C.

A process for producing the propylene resin is not particularly limited. As a method for obtaining the crystalline polypropylene, it can be produced by polymerizing propylene using a Ziegler-Natta catalyst described in, for example, WO 95/31490. Especially, it can be obtained using a catalyst for providing isotactic polypropylene by adjusting polymerization conditions. Further, it can also be obtained by mixing at least two types of materials formed separately through polymerization.

Concerning the elastic material used in the invention, the elastic material present in the propylene resin composition is a component of which the velocity of sound propagated as a longitudinal wave is 3,000 m/s or less, and is a high-molecular compound having a rubbery nature. Preferably, it is an olefinic elastic material. Examples of the olefin include α-olefins such as ethylene, propylene, butene-1 and the like, styrene, styrene derivatives and the like. An elastic material made of a homopolymer or a copolymer thereof and an elastic material made of these olefins and diolefins or polar monomers can be used.

More preferable examples thereof include an ethylenic elastic material made of a copolymer of ethylene and another α-olefin (having 3 to 20 carbon atoms), such as an ethyleneα-olefin random copolymer or an ethyleneα-olefin-non-conjugated polyene random copolymer, and a styrenic elastic material (SEBS) such as a styrenic-elastomer having a styrene content of 8 to 88 wt. % and a conjugated diene content of 12 to 92 wt. % or its hydrogenated material, for example, an SEBS block copolymer. Most preferable is an elastic material made of an ethylene-propylene copolymer or an ethylene-butene copolymer. A method for producing these elastic materials and a catalyst system required for the production are not particularly limited.

The content of these elastic materials is 0.05 to 50 wt. %, preferably 1 to 30 wt. %, more preferably 5 to 20 wt. %.

What is important in the elastic material in the invention is that as stated above, it is a component of which the velocity v of sound propagated as a longitudinal wave is 3,000 m/s or less. More specifically, an elastic material having the velocity v of sound of 2,500 m/s or less is preferable. When the velocity v of sound propagated as the longitudinal wave in the elastic material used in the propylene resin composition of the invention exceeds 3,000 m/s, there is no distinction between those velocities of elastic materials and crystalline polypropylene, and the Young's modulus thereof is approximately the same as that of crystalline polypropylene having a general density. Thus, the impact absorbability as the elastic material is notably impaired. In the invention, a method that can measure the velocity of sound propagated as the longitudinal wave is a general method when the elastic material that is required to be measured is obtained as a single-component bulk material. That is, it is measured by installing a transmitter and a receiver at both ends of the sample of which the thickness has been accurately measured, and measuring a time required for transmission and reception using a wavelength or a frequency having a satisfactory resolving power to a thickness. However, this is not critical. Further, when an elastic material that is required to be measured is not obtained as a single-component bulk material, for example, it is an elastic material such as an ethylene-propylene copolymer rubber or the like which is obtained by multi-stage polymerization during the polymerization, the sound velocity is measured preferably by an acoustic microscopy that has the power of resolution in a micro-region of $\mu$m order or the like. The measurement can be conducted by the method using interference of a leaky surface acoustic wave (Nishimura et al., 68 *Proceedings of the Japan Society of Mechanical Engineers*, vol. A, 910–17, 19–21, 1991). This method is convenient because the image of phase dispersion and the sound velocity are simultaneously found in the micro region of sample. Besides, in the observation of phase dispersion, an imaging method by the difference in elastic properties includes a force modulation method using an atomic force microscope or the like. In this method, regarding the difference in elastic properties of a local area, a probe of an atomic force microscope is vibrated within a fixed strain, and then detecting the change in stress (change in vibration phase or the like) to make an image (U.S. Pat. No. 5,237,859). This method is suited for observing the image of phase distribution mode of the elastic material, but does not measure the sound velocity.

By the above-mentioned methods, the sound velocity of the elastic material present in the propylene resin composition of the invention can be specified. However, these methods are not critical.

The relation of the propagation velocity v of the acoustic wave and the mechanical properties, especially the impact resistance in the elastic material of the invention is described below.

With respect to the testing method of mechanical properties regulated in ISO, JIS or the like in the propylene resin composition, there are the testing method of a multi-axial impact strength which is called the Izod impact or the Charpy impact strength and the testing method of a multi-axial impact strength which is called the falling weight impact or the du Pont impact, namely, a dart impact resistance. These are a part of important design guidelines for products used as industrial materials. In recent years, there has been a tendency that industrial material products are decreased in thickness, and it has been especially required that the propylene resin composition has both the necessary and sufficient condition for impact strength and rigidity as tested values. Regarding the testing method for these impact strengths, it has been said in view of fracture mechanics that the propagation velocity of crack tip surface (impact wave) by great deformation due to Izod impact, dart impact or the like is generally in the same order as the propagation velocity of the acoustic wave in the resin composition. Thus, with a view to improving the impact resistance, it is important in the propylene resin composition to control the substantial propagation velocity (namely, the exact decrease in velocity of the crack tip surface and the extension of the crack propagation path length) of crack or crack tip surface. For example, as it is hard to specify in what route thunder propagating with breaking electric insulation in air is dropped, so it is hard to predict the propagated condition of the wave surface in the actual fracture phenomenon. However, it is presumed in view of the fracture mechanics that the crack tip surface propagates inside the solid of the resin composition so as to propagate the same for as short a time as possible. From such a standpoint of the fracture mechanics, it is significant to optimize and realize the exact decrease in velocity and the extension of the propagation path length of the crack tip surface in the propylene resin composition. In the method for optimizing and realizing the elastic material in the invention, the relation of the acoustic wave and the elastic modulus, namely, the Young's modulus is described below. The propagation velocity v of the acoustic wave in the solid of the single-component resin bulk material is, as shown in formula (1), represented by the Young's modulus E of the solid and the density ρ of the solid (*Jikken Butsurigaku Koza, Onkyo to Shindo*, compiled by S. Igarashi, Kyoritsu Shuppan).

$$v = (\text{Young's modulus E of solid/density } \rho \text{ of solid})1/2 \quad (1)$$

That is, the propagation velocity v is a function of the elastic modulus of the resin and the density of the resin. For example, it is understood from formula (1) that for decreasing the to propagation velocity, the elastic material is generally required to have a low elastic modulus and a high density.

Next, that the separated micro phase structure of the elastic material in the propylene resin composition of the invention has the percolation structure in the resin solid space is described.

Percolation inherently means penetration. It has been taken up as a physical problem to investigate a degree of bonding and a degree of penetration for macro-properties as a function of how micro-properties are distributed and dispersed in a system. As a specific percolation problem, when each point that is distributed and dispersed as micro-points is given a probability of bonding between the individual points, a group provided by bonding the points is called a cluster. Then, it is possible to find a probability of the points being included in a cluster having a finite size. Likewise, a probability of the points being included in a cluster having an infinite size can be calculated (Zallen et al., Physical Review B, 4(12), 4471–4479, 1971). For example, when points have a finite size and a bonding probability is given as a function of a distance, transition occurs in which a probability of the points being included in an infinite cluster is not 0. These are applied to a problem related to a phase transition behavior or a critical behavior in which micro-properties are exhibited externally as macro-properties (T. Odagaki, Science of Percolation, Shokabo, 1993).

The structure called "percolation structure" in the invention refers to an intricate continuous structure in which the phase of elastic material, the component with the velocity v of sound propagated as a longitudinal wave being 3,000 m/s or less, forms a network appearing when a probability of inclusion in a cluster of the same component infinitely spread is not 0. FIG. 1 shows a two-dimensional schematic view of the percolation structure. A network structure formed with a mesh-like fine pattern owing to a small area of a black portion is also available. The other names given when forming such a percolation structure are an OBDD structure (ordered bicontinuous double diamond: H. Hasegawa et al., Macromolecules, 20, 1651, 1987) in which tetrapod forms are continuously connected, a gyroidal or three-dimensional lamellar structure and the like. However, these are not critical. Further, the size Λm of the periodical structure shown in FIG. 1 in the invention may be any size so long as it does not impair the uniform structure as the overall propylene resin composition. In a molded product obtained by extrusion molding, injection molding or the like, the size Λm of the periodical structure is preferably 0.01 μm to several-hundred μm. When the separated micro phase structure of the phase of elastic material in the propylene resin composition has this percolation structure, the uniformity of the overall structure is high and the continuity of the distribution of the elastic material phase having the impact absorption is high. Thus, it is advantageous in the extension of the propagation path of the crack tip surface from the standpoint of the structure of fracture mechanics. When the elastic material present in the propylene resin composition of the invention is the component with the velocity v of sound propagated as the longitudinal wave being 3,000 m/s or less and the separated micro phase structure of the phase of elastic material in the propylene resin composition has this percolation structure as identified by the ultrasonic measurement or the force modulation method using the atomic force microscope satisfies the percolation structure in which the phase of elastic material is infinitely continuous in the resin solid space, the overall uniform structure, the excellent moldability and the good balance of mechanical properties can be attained. However, a structure having no such percolation structure includes a spherical distribution structure, a cylinder-like structure and a lamellar structure. In the spherical distribution, the impact strength is notably decreased in some size of dispersed particles. Further, in the cylinder-like structure and the lamellar structure, the uniformity is impaired, anisotropy occurs in the balance of properties, and the impact strength is likewise decreased.

Moreover, a melt flow rate (MFR) at a temperature of 230° C. under load of 2.16 kgf in the propylene resin composition of the invention is not particularly limited. Various MFR's can be determined depending on the molding and the use. In the extrusion molding of sheet, foam or the like, it is generally preferable that MFR is in the range of 0.01 to 10 dg/min. In the blow molding, it is generally preferable that MFR is in the range of 0.1 to 20 dg/min. In the usage of fibers, nonwoven fabrics or the like, it is generally preferable that MFR is in the range of 10 to 70 dg/min. In the application of the injection molding, it is generally preferable that MFR is in the range of 5 to 300 dg/min. However, these are not critical in the propylene resin composition of the invention.

In the propylene resin composition comprising the propylene resin and the elastic material in the invention, any composition of the propylene resin and the elastic material and any mixing amounts thereof will do so long as the elastic material has the velocity of sound as the longitudinal wave being 3,000 m/s or less and the phase of elastic material has the percolation structure. The following composition and mixing amounts can be set. For example, specifically, such a combination of compatibility that the phase of olefinic elastic material is gradually excluded from the amorphous phase of the propylene resin is preferable when the propylene resin and the olefinic elastic material are the constituting requirements of the invention, and further, for example, while the melt mixture of these is cooled. To be concrete, (1) the phase of elastic material can have the percolation structure even in the amount of at least 0.05 wt. % and less than 1 wt. %, and the propylene resin composition of the invention becomes excellent in balance of properties and moldability. Further, the amount of the elastic material can be increased. However, when it exceeds 50 wt. %, the amount of the propylene resin having the crystallinity is decreased to invite the decrease in heat resistance and elastic modulus. Thus, the effects of the invention tend to decrease. It is preferably 30 wt. % or less, more preferably 20 wt. % or less. However, the very combination and mixing amounts are not critical in the invention.

(2) To increase the stereoregularity of the propylene resin is taken up. Since isotacticity of the propylene resin is high, the chain of the propylene resin in the amorphous phase is rather constrained. Accordingly, for example, the ability to gradually exclude the elastic material in the step of cooling the melt mixture of these is excellent. Further, as the elastic material, the monomer composition of ethylene and propylene is not particularly limited. However, the elastic material with the content of the propylene monomer exceeding 55 wt. % is excellent in specific compatibility with the amorphous phase. Thus, it can easily be formed into the percolation structure. The elastic material with the content of propylene monomer being 60 wt. % or more is more preferable. However, since these compatibilities depend on the cooling step and each degree of polymerization, the content of propylene monomer is not absolutely limited to the same.

As stated above, the propylene resin is produced by melt-mixing the propylene resin with the elastic material upon selecting conditions such that the elastic material is excluded from the amorphous phase of the propylene resin in the step of cooling the melt mixture and the separated micro phase structure of the phase of elastic material forms the percolation structure in which the elastic material is infinitely continuous in the resin solid space.

Besides this, as a method for forming the percolation structure, a method in which phase separation of each composition using trichlorobenzene or the like as a common solvent is conducted by spinodal decomposition from approximately the critical composition can be mentioned.

When the common solvent is used, the production is conducted upon selecting conditions such that in the step of dissolving the propylene resin and the elastic material in the common solvent and then evaporating this solvent, the elastic material is gradually separated from the amorphous phase of the propylene resin and the separated micro phase structure of the elastic material forms the percolation structure.

In case of the melt mixing or the mixing with the common solvent, in order to obtain the percolation structure, it is necessary to select, as required, the conditions such as the combination, the mixing method and the like in consideration of the degrees of polymerization, the compatibility (thermodynamical interaction of solubility parameter and the like), chain dynamics (dynamic interaction of Tg, Tm and the like) and the like of the propylene resin and the elastic material. In the mixing, it is possible that both components are first mixed in a symmetrical composition like 50/50 to previously form the percolation structure, at least one component is gradually added so as not to destroy the previous percolation structure and strongly-segregated composition is provided.

In the propylene resin composition of the invention, the propylene resin and the elastic material which are the constituents thereof can separately be obtained by polymerization and then mixed. In this case, when the propylene resin of the invention is produced by mixing plural polymerization components, the known technique can be used as such. Examples thereof include a method in which a powder and pellets obtained by polymerization are mixed batchwise with a mixer, a tumbler or the like and a method in which they are continuously added to a pneumatic conveyance device or the like using a metering device for mixing. In order to increase the degree of mixing, a melt-mixing method is used. For example, there is a method in which a powder and pellets are melt-mixed with a melt kneader, for example, a kneader, a roll, Brabender, an extruder or the like and the mixture is pelletized with a pelletizer. The extruder is generally used to increase the productivity, though it is not particularly limited. A twin-screw extruder having rotor disks is especially preferable. Further, when materials quite different in molecular weight or melt viscosity are melt-mixed, a tandem extruder in which two extruders are connected in series is more preferable.

Moreover, in the process for obtaining the propylene resin composition, it can also be obtained from these constituents by a method in which the propylene resin is formed in a polymerization system and the elastic material is successively obtained. With respect to a specific process in this case, it can be obtained by multi-stage polymerization using the polymerization catalyst and the polymerization method for obtaining the propylene resin. To be more concrete, it is possible that at the first stage, the propylene homopolymer is obtained and then propylene and ethylene or an α-olefin are copolymerized to obtain the elastic material. As the α-olefin, olefins having 2 to 20 carbon atoms are selected. Specific examples thereof can include ethylene, propylene, 1-butene, 1-pentene, 1-hexene, 1-heptene, 1-octene, 1-decene and 4-methyl-1-pentene. Two types of these comonomers can be mixed and used in the copolymerization with propylene.

In the propylene resin composition according to the invention, various additives, compounding agents, fillers and the like can be used unless the characteristics thereof are impaired. Specific examples of these include an antioxidant, a heat stabilizer, an ultraviolet absorber, a light stabilizer, a weathering stabilizer, an antistatic agent, an anti-fogging agent, a flame retardant, a lubricating agent, a slip agent, an anti-blocking agent, a plasticizer, a release agent, a foaming agent, inorganic fillers such as talc, silica and the like, fibrous inorganic fillers such as glass fibers, carbon fibers and the like, organic fillers, a reinforcing agent, a coloring agent, a dye, a pigment, a flavor and the like. Additives which have various states such as liquid, solid and the like and which have various aspect ratios and particle size distributions are available. Moreover, various thermoplastic resins and the like can also be added.

To the propylene resin or resin composition of the invention, various nucleating agents may be added as required. Examples thereof include metal salts of carboxylic acids, dibenzylidene sorbitol derivatives, phosphate metal salts, and inorganic compounds such as talc, silica and the like. Specific examples thereof include sodium benzoate, aluminum adipate, sodium thiophenecarboxylate, 1,3,2,4-dibenzylidenesorbitol, 1,3,2,4-di-(p-methylbenzylidene) sorbitol, 1,3-p-chlorobenzylidene-2,4-p-methylbenzylidenesorbitol, sodium bis-(4-t-butylphenyl) phosphate, sodium bis-(4-methylphenyl)phosphate, potassium bis-(4-t-butylphenyl)phosphate, sodium 2,2'-methylenebis-(4,6-di-t-butylphenyl)phosphate, sodium 2,2'-ethylidenebis(4,6-di-t-butylphenyl)phosphate, talc, potassium carbonate and the like. These nucleating agents can be used either singly or in combination.

It is advisable that the amount of the nucleating agent added is 0.01 to 2.0 parts by weight per 100 parts by weight of the propylene resin or the resin composition containing the propylene resin. It is preferably 0.05 to 1.0 part by weight, especially preferably 0.06 to 0.4 part by weight. When the amount of the nucleating agent is less than 0.01 part by weight, the effects of improving the rigidity and the heat resistance are poor, and this is not desirous. When it exceeds 2.0 parts by weight, the effects are sometimes saturated, which results in high costs.

The propylene resin and the composition containing the propylene resin in the invention can be formed into products of desired shapes using the known molding technique which is generally practiced in the field of synthetic resins. The molding technique is not particularly limited. There are injection molding, blow molding and extrusion molding depending on a shape of a molding machine. Further, there are film forming, tentering, sheet forming, vacuum forming, extrusion lamination, calendering, profiling, fiber spinning, nonwoven fabric, compression molding, blow molding and the like depending on the shape of the molded resin product. A product having a desired shape can be formed by using these molding techniques singly or in combination.

For example, in case of the injection molding, the technique is not particularly limited so long as it is used as a known technique. However, it can be conducted by charging a resin plasticized in a hot screw into a predetermined mold, subjecting the same to dwell pressure application and cooling and solidifying the product. Examples of the injection molding machine include a plunger-type injection molding machine, a screw preplasticization-type molding machine, an in-line screw-type injection molding machine, a bent-type injection molding machine, a gas assist-type injection molding machine, an injection compression molding machine, an injection extrusion molding machine, an injection blow molding machine and the like. Generally, the injection molding is suited for mass-producing a product of a complicated shape with an excellent dimensional precision and a short molding cycle. As the propylene resin used in the molding, a resin free from flow mark, silver or the like which occurs owing to the resin flow in charging is preferable.

With respect to the combination of the plural molding techniques, for example, in the vacuum forming, a molded product can be mass-produced at low costs such that a sheet produced by T die extrusion molding, calendering or the like is heat-softened while clamping both ends of the sheet, the sheet plasticized and softened is adhered to the mold by evacuating a space between a female die and the clamp and using a plug, compressed air and the like to mold the same and the molded product is cooled and then withdrawn from the mold. It is generally preferable that an ethylene resin is added to the propylene resin used in the molding in order to avoid drawdown such as sagging, deformation or the like due to the weight of the sheet itself in the heat-softening. However, when the ethylene resin is added, the decrease in rigidity or heat resistance is unescapable. Thus, it is most preferable to control the occurrence of the drawdown with the propylene resin alone.

The propylene resin composition of the invention has, as a whole, a uniform structure, is excellent in moldability and has a good balance of mechanical properties because the elastic material present in this composition has the specific micro phase structure. Accordingly, the propylene resin composition of the invention is useful in industrial materials or the like, and in products obtained by the injection molding and products obtained by blow-extrusion molding or the like, such as fibers, films, sheets and foams.

The invention is specifically illustrated below by referring to Examples. The properties of the polymer in Examples and Comparative Examples were measured by the following methods. Incidentally, the invention is not limited thereto.
MFR and HL (High Load) MFR:
Measured at a temperature of 230° C. according to JIS K 7210 (unit is g/10 minutes).
Flexural Modulus:
Test pieces were prepared by injection molding according to the method described in JIS K 6758. The flexural modulus was measured according to JIS K 7203 (unit is MPa).
Uniaxial Impact Test:
Measured at 23° C. and −30° C. as an Izod impact strength according to ISO 180 (unit is J/m).
Multi-axial Impact Test:
Measured energy with 50% fracture at 23° C. as a falling weight impact strength according to JIS K 7211 (unit is J/m).
Heat Resistance:
Heat resistance was measured as a heat distortion temperature (HDT) according to JIS K 7207.
Evaluation of Moldability:
With respect to an adaptability to vacuum forming, a propylene resin having low MFR of 2 g/10 minutes or less was formed into a sheet having a width of 50 mm, a thickness of 50 Hm and a length of 150 mm with a 50-mm T die. A drawdown property and an appearance of a molded product were evaluated using a cup-like mold by a simple vacuum-forming device of our company.

With respect to the adaptability to the injection molding, the propylene resin with MFR exceeding 2 g/10 minutes was formed into a large-sized flat plate (600×150×0.5 mm) having a high flow aspect using a 500 T injection molding machine manufactured by Toshiba Machine Co., Ltd., and the moldability was then evaluated. With respect to the fillability, an unfilled matter, a drop sink mark and a burr were detected by visually observing the molded product. With respect to the appearance, a flow mark, a wavy mark and silver were visually observed. A product free from these was evaluated to be good.

Method for Preparing a Xylene Extraction Insoluble Fraction (XI):

Approximately 2 g of the powdery propylene resin was accurately measured, and used as a sample. A 300-ml flask fitted with an Allihn condenser and a thermometer was charged with the sample and 250 ml of o-xylene, and heated. The heating was conducted at a temperature of 135° C. for 30 minutes. Subsequently, the mixture was allowed to cool to 25° C. Then, the solid matter was filtered, and heat-dried in a nitrogen atmosphere at 140° C. for 30 minutes. After the product was allowed to cool satisfactorily, the weight was measured. It was defined as a xylene-insoluble matter.

Measurement of Isotactic Pentad Ratio (IP):

IP of the sample prepared in XI was measured under the following measuring conditions using JNM-GSX 400 ($^{13}$C nuclear resonance frequency 100 MHz) manufactured by JEOL, Ltd. IP was calculated according to the method described in Macromolecules, vol. 6, p. 925 (published 1973).

Measuring mode: proton decoupling method

Pulse width: 8.0 $\mu$s

Pulse repeating time: 3.0 $\mu$s

Number of integrations: 20,000

Solvent: 1,2,4-trichlorobenzene/benzene deuteride mixed solvent (75/15 weight ratio)

Internal standard compound: hexamethyldisiloxane

Sample concentration: 300 mg/3.0 ml (solvent)

Measuring temperature: 120° C.

Method for Measuring a Velocity v of Sound Popagated as a Longitudinal Wave of an Elastic Material:

The measurement was conducted under the following conditions using a mechanical scanning acoustic microscope (HSAM-200) manufactured by Hitachi Construction Machinery Co., Ltd. The sound velocity was obtained by the method described in *Nippon Kikai Gakkai Zairyo Rikigaku Koenkai Koen Yokoshu* No. 900–86, p. 673 (published 1990) in which an ultrasonic focus is placed on an elastic material intended to measure a defocus interference fringe.

Measuring mode: VZ mode

Frequency: 600 MHz

Sample: 10 mm×10 mm

Contact medium: water

Measuring temperature: 23° C.

Observation of Morphology of an Elastic Material:

The morphology of the elastic material present in the propylene resin composition was observed by imaging the dispersion structure of the elastic material in the surface and the inside under the following measuring conditions using a mechanical scanning acoustic microscope (HSAM-200) manufactured by Hitachi Kenki Construction Machinery Co., Ltd.

Measuring mode: C mode

Frequency: 630 MHz

Observation sample region: 104 $\mu$m×104 $\mu$m

Contact medium: water

Measuring temperature: 23° C.

(FIG. 2 is an example of measuring the surface of the composition obtained in Example 1 using an acoustic microscope.)

Method for Identifying Morphology:

An image of a phase separation structure obtained was analyzed under the following resolution conditions using an image analyzer (Image-ProPlus) manufactured by Media Cybanetics L.P., and it was judged whether the elastic material present in the propylene resin composition intended had the percolation structure.

As a concrete analytical method, the image of the phase separation structure obtained was subjected to histogram analysis of reflection intensity. In this analysis, the reflection intensity measured is divided into 16 bits, and depicted in the abscissa axis, while the frequency of the pixel measured is depicted in the ordinate axis to provide a reflection intensity histogram. Then, the distribution curve depending on the composition is obtained. That is, in this histogram, a material can usually be divided into components clearly different in intensity distribution like two peaks. Accordingly, the elastic material present in the propylene resin composition could minutely be classified, and the respective portions were grouped (according to colors). The sound velocities of the elastic material portions grouped were measured by an acoustic microscope at the same time. Thus, it was identified that the elastic materials had the sound velocity of 3,000 m/s or less.

When the pixels (colors) of the elastic materials grouped were continuous on the screen, it was judged that the percolation structure was formed (FIG. 3, Example 1).

CPU: IBMPowerPC 750 400 MHz

Number of observation pixels:

512 pixels×512 pixels×8 bits

In FIG. 3, a sea portion indicates polypropylene, and an island portion indicates an elastic material. The inner portion (portion of a light color) (yellow in an actual screen) of the island portion indicates one component (propylene-rich) of the elastic material, and a portion of a dark color (red in the actual screen) trimming the island portion indicates another elastic material portion (ethylene-rich). This portion of the dark color is found to be continuous. Incidentally, in the reflection intensity distribution, polypropylene showed the highest intensity, and it was the propylene-rich elastic material that showed the lowest intensity.

EXAMPLE 1

Preparation of a Catalyst Component for Olefin Polymerization:

(1) Preparation of a Solid Component

Anhydrous magnesium chloride (568 g, 5.97 mols) was completely dissolved in 1.0 kg (1.74 mols) of anhydrous ethanol, 5.0 liters of vaseline oil "CP15N" made by Idemitsu Petrochemical Co., Ltd. and 5.0 liters of silicon oil "KF 96" made by Shin-etsu Silicone K.K. in a nitrogen atmosphere at 120° C. This mixture was stirred at 120° C. and 3,000 rpm for 3 minutes using TK Homomixer manufactured by Tokushu Kika Kogyo Co., Ltd. While conducting the stirring, the reaction mixture was fed to 20 liters of anhydrous heptane such that the temperature did not exceed 0° C. The resulting white solid matter was thoroughly washed with anhydrous heptane, and vacuum-dried at room temperature. Three-hundred grams of the resulting $MgCl_2 \cdot 2.5C_2H_5OH$ spherical solid matter was suspended in 2.0 liters of anhydrous heptane. While the suspension was stirred at 0° C., 5.0 liters (45 mols) of titanium tetrachloride was added dropwise over the course of 1 hour. Subsequently, the heating started. When the temperature reached 40° C., 49.6 g (178 mmols) of diisobutyl phthalate was added, and the temperature was raised to 1000° C. for approximately 1 hour. After the reaction was conducted at 100° C. for 2 hours, the solid portion was collected through hot filtration.

Then, this reaction mixture was suspended in 5.0 liters (45 mols) of titanium tetrachloride, and the reaction was conducted at 120° C. for 1 hour. After the completion of the reaction, the solid portion was recollected through hot filtration. Subsequently, the solid portion was rinsed seven times with 10 liters of hexane of 60° C. and three times with 10 liters of hexane of room temperature to obtain a solid component.

(2) Preparation of $TiCl_4$ [$C_6H_4(COOiC_4H_9)_2$]

Diisobutyl phthalate (278 g, 1.0 mol) was added dropwise to a solution of 190 g (1.0 mol) of titanium tetrachloride in 10 liters of hexane for approximately 30 minutes while maintaining the temperature at 0° C. After the completion of the dropwise addition, the temperature was raised to 40° C., and the reaction was conducted for 30 minutes. After the completion of the reaction, the solid portion was collected, and rinsed three times with 5.0 liters of hexane to obtain a desired product.

(3) Treatment with $TiCl_4$ [$C_6H_4(COOiC_4H_9)_2$]

Four-hundred grams of the solid component obtained in (1) was suspended in 6.0 liters of toluene, and the suspension was treated with 103 g (220 mmols) of $TiCl_4$ [$C_6H_4(COOiC_4H_9)_2$] at 25° C. for 1 hour, and carried thereon. After the completion of the carrying, the solid portion was collected through filtration. Subsequently, this reaction product was suspended in 6.0 liters of toluene and 200 ml (1.8 mols) of titanium tetrachloride, and the reaction was then conducted at 90° C. for 2 hours. After the completion of the reaction, the solid portion was recollected through hot filtration. Subsequently, the solid portion was rinsed five times with 10 liters of toluene of 90° C. and three times with 10 liters of hexane of room temperature to obtain a solid catalyst component for olefin polymerization.

Prepolymerization

Ten liters of n-heptane, 120 g (1.6 mols) of triethylaluminum, 78 g (340 mmols) of dicyclopentyldimethoxysilane and 200 g of the solid catalyst component for olefin polymerization obtained in (3) were charged into an autoclave having an internal volume of 50 liters in a nitrogen atmosphere, and stirred at a temperature of 0 to 5° C. for 5 minutes. Subsequently, propylene was fed to the autoclave such that 10 g, per gram of the solid catalyst component, of propylene was polymerized, and the prepolymerization was conducted at a temperature of 0 to 5° C. for 1 hour. The resulting prepolymerization catalyst was rinsed three times with 10 liters of n-heptane, and used in the production of the following propylene resin.

Polymerization of Propylene at a First Stage

Propylene (95 kg/hr), 10 g/hr of the prepolymerization catalyst, 59 g/hr (520 mmols/hr) of triethylaluminum, 35.3 g/hr (155 mmols/hr) of dicyclopentyldimethoxysilane and 0.6 mol% of hydrogen for adjusting polymerization were continuously fed to an autoclave fitted with a stirrer and having an inner volume of 290 liters while MFR was adjusted to 30 g/10 minutes. The reaction vessel was maintained at 80° C., and bulk slurry polymerization of liquefied propylene was conducted to polymerize propylene. A part thereof was sampled. Then, a propylene polymer (P-1-1) having MFR of 30 g/10 minutes was obtained as expected.

Polymerization of Propylene at a Second Stage

Sixty grams/hr of ethylene, 95 kg/hr of propylene and 0.02 mol% of hydrogen for adjusting polymerization were charged into a reaction vessel fitted with a stirrer and having an internal volume of 580 liters while the polymer containing the active catalyst at the first stage was fed and MFR was adjusted to 0.5 g/10 minutes. The reaction vessel was maintained at 80° C., and bulk slurry polymerization of liquefied propylene was conducted to obtain a polymer (P-1) (MFR 18 g/10 minutes) in the overall two-stage polymerization, containing the polymer at the first stage and the polymer at the second stage.

Additives, 0.09 part by weight of tris(2,4-di-t-butylphenyl)phosphite, 0.15 part by weight of pentaerythrityltetrakis[3-(3,5-di-t-butyl-4-hydroxyphenyl)propionate], 0.08 part by weight of calcium stearate and 0.2 part by weight of sodium 2,2'-methylenebis(4,6-di-t-butylphenyl)phosphate ("NA-11" made by Asahi Denka Kogyo K.K.) were added to 100 parts by weight of the polymer (P-1) in the overall two-stage polymerization through melt-kneading, and the mixture was pelletized to give a propylene resin (P-1-R). The resulting propylene resin (P-1-R) had MFR of 19 g/10 minutes, and the properties thereof were shown in Table 2. Further, the polymer as a component and MFR of the overall resin were shown in Table1 (the same applies to the following Examples).

The adaptability to the injection molding was evaluated using this propylene resin (P-1-R). Consequently, a flat plate having a beautiful appearance and free from problems of flow mark, silver and the like was obtained.

EXAMPLE 2

Polymerization of Propylene at a First Stage

Propylene (95 kg/hr), 10 g/hr of the prepolymerization catalyst, 59 g/hr (520 mmols/hr) of triethylaluminum, 35.3 g/hr (155 mmols/hr) of dicyclopentyldimethoxysilane and 1.6 mol% of hydrogen for adjusting polymerization were continuously fed to an autoclave fitted with a stirrer and having an internal volume of 290 liters while MFR was adjusted to 120 g/10 minutes. The reaction vessel was maintained at 80° C., and bulk slurry polymerization of liquefied propylene was conducted to polymerize propylene. A part thereof was sampled. Then, a propylene polymer (P-1-2) having MFR of 120 g/10 minutes was obtained as expected.

Polymerization of Propylene at a Second Stage

Fifty kilograms/hr of ethylene, 95 kg/hr of propylene and 0.06 mol% of hydrogen for adjusting polymerization were charged into a reaction vessel fitted with a stirrer and having an internal volume of 580 liters while the polymer containing the active catalyst at the first stage was fed and MFR of the propylene polymer (P-2-2) at the second stage only was adjusted to 1 g/10 minutes. The reaction vessel was maintained at 80° C., and bulk slurry polymerization of liquefied propylene was conducted to obtain a propylene polymer (P-2-12) in the overall two-stage polymerization, containing the polymer at the first stage and the polymer at the second stage.

Polymerization of Propylene

Propylene (95 kg/hr) and 2.0 mol% of hydrogen for adjusting polymerization were charged into a reaction vessel fitted with a stirrer and having an internal volume of 290 liters while MFR of the polymer at the first stage only was adjusted to 300 g/10 minutes. The reaction vessel was maintained at 80° C., and bulk slurry polymerization with liquefied propylene was conducted. Consequently, a propylene polymer (P-2-3) (MFR 300 g/10 minutes) was obtained.

Further, additives, 0.09 part by weight of tris(2,4-di-t-butylphenyl)phosphite, 0.15 part by weight of pentaerythrityltetrakis[3-(3,5-di-t-butyl-4-hydroxyphenyl)propionate], 0.08 part by weight of calcium stearate, 15 parts by weight of talc ("MT5D" made by Fuji Talc) and 0.2 part by weight of sodium 2,2'-methylenebis(4,6-di-t-butylphenyl)phosphate ("NA-11" made by Asahi Denka Kogyo K.K.) were added to 5 parts by weight of an ethylene-octene copolymer (P-2-4) having MFR of 11.9 g/10 minutes by adjusting monomers and hydrogen for adjusting polymerization to be charged, 7 parts by weight of an SEBS triblock copolymer ("Dynaron" E4600P made by Japan Synthetic Rubber Co., Ltd.) having MFR of 5.2 g/10 minutes, and 58 parts by weight of a polymer (P-2-12) in the overall two-stage polymerization and 30 parts by weight of the propylene polymer (P-2-3) through melt-kneading, and the mixture was pelletized to give a propylene resin (P-2-R). The resulting propylene resin (P-2-R) had the composition shown in Table 1, and the properties thereof were shown in Table 2.

The adaptability to the injection molding was evaluated using this propylene resin (P-2-R). Consequently, a flat plate having a beautiful appearance and free from problems of flow mark, silver and the like was obtained.

EXAMPLE 3

Polymerization of Propylene at a First Stage

Propylene (95 kg/hr), 10 g/hr of the prepolymerization catalyst, 59 g/hr (520 mmols/hr) of triethylaluminum, 35.3 g/hr (155 mmols/hr) of dicyclopentyldimethoxysilare and 1.9 mol% of hydrogen for adjusting polymerization were continuously fed to an autoclave fitted with a stirrer and having an internal volume of 290 liters while MFR was adjusted to 203 g/10 minutes. The reaction vessel was maintained at 70° C., and bulk slurry polymerization of liquefied propylene was conducted to polymerize propylene. A propylene polymer (P-3-1) was obtained.

Polymerization of Propylene at a Second Stage

Fifty kilograms/hr of ethylene, 95 kg/hr of propylene and 0.06 mol% of hydrogen for adjusting polymerization were charged into a reaction vessel fitted with a stirrer and having an internal volume of 580 liters while the polymer containing the active catalyst at the first stage was fed and MFR of the propylene polymer (P-3-2) at the second stage only was adjusted to 1 g/10 minutes. The reaction vessel was maintained at 80° C., and bulk slurry polymerization of liquefied propylene was conducted to obtain a propylene polymer (P-3-12) in the overall two-stage polymerization, containing the polymer at the first stage and the polymer at the second stage.

Subsequently, 75 parts by weight of the propylene polymer (P-3-12), 25 parts by weight of an ethylene-propylene copolymer rubber having MFR of 0.7 g/10 minutes, 7 parts by weight of talc (MT5D made by Fuji Talc), 0.09 part by weight of tris(2,4-di-t-butylphenyl)phosphite, 0.15 part by weight of pentaerythrityltetrakis [3-(3,5-di-t-butyl-4-hydroxyphenyl)propionate], 0.08 part by weight of calcium stearate and 0.2 part by weight of sodium 2,2'-methylenebis(4,6-di-t-butylphenyl)phosphate ("NA-11" made by Asahi Denka Kogyo K.K.) were melt-kneaded at 210° C. and 300 rpm using a twin-screw extruder (KTX Series manufactured by Kobe Steel Ltd.) to obtain a propylene resin (P-3-R) having MFR of 31.9 g/10 minutes. The properties of the resulting propylene resin (P-3-R) were shown in Table 2.

The adaptability to the injection molding was evaluated using this propylene resin. Consequently, a flat plate having a beautiful appearance and free from problems of flow mark, silver and the like was obtained.

EXAMPLE 4

Likewise, the composition of the resin portion shown in Table 1 was melt-kneaded with 0.09 part by weight of tris(2,4-di-t-butylphenyl)phosphite, 0.15 part by weight of pentaerythrityltetrakis[3-(3,5-di-t-butyl-4-hydroxyphenyl)propionate], 0.08 part by weight of calcium stearate and 0.2 part by weight of sodium 2,2'-methylenebis(4,6-di-t-butylphenyl)phosphate ("NA-11" made by Asahi Denka Kogyo K.K) at 210° C. and 300 rpm using a twin-screw extruder (KTX Series manufactured by Kobe Steel Ltd.) to obtain a propylene resin (P-4-R) having MFR of 0.7 g/10 minutes. The properties of the resulting propylene resin (P-4-R) were shown in Table 2.

The adaptability to the vacuum forming was evaluated using this propylene resin. Consequently, drawdown was low, and it was fully moldable.

EXAMPLE 5

Likewise, the composition of the resin portion shown in Table 1 was melt-kneaded with 0.09 part by weight of tris(2,4-di-t-butylphenyl)phosphite, 0.15 part by weight of pentaerythrityltetrakis[3-(3,5-di-t-butyl-4-hydroxyphenyl)propionate], 0.08 part by weight of calcium stearate and 0.2 part by weight of sodium 2,2'-methylenebis(4,6-di-t-butylphenyl)phosphate ("NA-11" made by Asahi Denka Kogyo K.K;) at 210° C. and 300 rpm using a twin-screw extruder (KTX Series manufactured by Kobe Steel Ltd.) to obtain a propylene resin (P-5-R) having MFR of 0.7 g/10 minutes. The properties of the resulting propylene resin (P-5-R) were shown in Table 2.

The adaptability to the injection molding was evaluated using this propylene resin. Consequently, a flat plate having a beautiful appearance and free from problems of flow mark, silver and the like was obtained.

Comparative Examples 1 to 5

The prepolymerization was conducted in the same manner as in Example 1 using the solid component obtained in (1) Preparation of a solid component in Example 1 as a polymerization catalyst. Likewise, the same additives as used in Example 1 were added to the polymer with MFR shown in Table 1 in the composition ratio shown in Table 1 through melt-kneading, and the mixture was pelletized as in Example 1 to obtain a propylene resin (Q-1-R). The properties of the resulting propylene resin (Q-1-R) were shown in Table 2.

All of these did not form the percolation structure in the elastic materials intended which were added. Further, the impact strength was not satisfactory.

TABLE 1

| Polymer as component or resin as overall component | MFR (g/10 min) | Type of polymer | Composition ratio of resin portion (parts by weight) |
|---|---|---|---|
| Ex. 1 | | | |
| (P-1-1) | 30 | Homo PP | 82 |
| (P-1-2) | 0.5 | EPCO | 18 |
| (P-1) | 18 | HECO | — |
| (P-1-R) | 19 | Composition | — |
| Ex. 2 | | | |
| (P-2-1) | 120 | Homo PP | 50 |
| (P-2-2) | 1 | EPCO | 8 |
| (P-2-12) | 64 | HECO | — |
| (P-2-3) | 300 | Homo PP | 30 |

TABLE 1-continued

| | | | |
|---|---|---|---|
| (P-2-4) | 11.9 | EOR | 5 |
| (P-2-5) | 5.2 | SEBS | 7 |
| (P-2-R) | 81.3 | Composition | |
| Ex. 3 | | | |
| (P-3-1) | 203 | Homo PP | 65 |
| (P-3-2) | 1 | EPCO | 10 |
| (P-3-12) | 100 | HECO | — |
| (P-3-3) | 0.7 | EPR | 25 |
| (P-3-R) | 31.9 | Composition | — |
| Ex. 4 | | | |
| (P-4-1) | 1 | Homo PP | 66 |
| (P-1-2) | 0.5 | EPCO | 16 |
| (P-4-12) | 0.6 | HECO | — |
| (P-4-3) | 0.8 | LDPE | 18 |
| (P-4-R) | 0.7 | Composition | — |
| Ex. 5 | | | |
| (P-3-12) | 100 | HECO | 80 |
| (P-5-2) | 12 | SEBS | 20 |
| (P-5-R) | 57 | Composition | — |
| Comp. Ex. 1 | | | |
| (Q-1-1) | 50 (HLMFR) | Homo PP | 87 |
| (Q-1-2) | 3 | LDPB | 13 |
| (Q-1) | — | — | — |
| (Q-1-R) | 0.5 | Composition | — |
| Comp. Ex. 2 | | | |
| (Q-2-1) | 30 | Homo PP | 92 |
| (Q-2-2) | 7 | EPR | 8 |
| (Q-2) | — | — | — |
| (Q-2-R) | 24.2 | Composition | — |
| Comp. Ex. 3 | | | |
| (P-4-12) | 0.6 | HECO | 92 |
| (Q-3-3) | 1.1 | EPR | 8 |
| (Q-3-R) | 0.9 | Composition | |
| Comp. Ex. 4 | | | |
| (Q-4) | 60.0 | Homo PP | 85 |
| | 2.0 | SEBS | 15 |
| (Q-4-R) | 38.0 | Composition | |
| Comp. Ex. 5 | | | |
| (P-3-12) | 100 | HECO | 88 |
| (Q-5-3) | 0.2 | EBR | 5 |
| (Q-5-4) | 0.6 | SEBS | 7 |
| (Q-5-R) | 24.0 | — | — |

| | |
|---|---|
| homo PP | homopolypropylene |
| EPCO | ethylene-propylene copolymer |
| HECO | heterophasic copolymer |
| SEBS | styrene-ethylene-butylene-styrene block copolymer |
| EPR | ethylene-propylene copolymer rubber |
| EBR | ethylene-butylene copolymer rubber |
| EOR | ethylene-octene copolymer rubber |
| LDPE | low-density polyethylene |

TABLE 2

| | Measuring method | Unit | Ex. 1 | Ex. 2 | Ex. 3 | Ex. 4 | Ex. 5 |
|---|---|---|---|---|---|---|---|
| Type of resin | | | (P-1-R) | (P-2-R) | (P-3-R) | (P-4-R) | (P-5-R) |
| MFR of resin | JIS K 7210 | g/10 min | 19.0 | 81.3 | 31.9 | 0.7 | 57.0 |
| Sound velocity (of elastic material charged) | SAM*2) | m/s | 1640 | 1300 | 1800 | 2440 | 1400 |
| IP (%) | MSS | % | 98.5 | 99.0 | 98.9 | 98.9 | 98.9 |
| XI (%) | MSS | % | 85.0 | 81.0 | 75.0 | 92.0 | 81.0 |
| FM (MPa) | JIS K 7201 | Mpa | 1310 | 2600 | 1200 | 1300 | 1900 |
| Uniaxial impact strength (Izod notched 23° C.) | iso 180 | J/m | 120 | 410 | NB | 100 | 290 |
| Uniaxial impact strength (Izod notched −30° C.) | iso 180 | J/m | 35 | 40 | 100 | 80 | 41 |
| Multi-axial impact strength (Du pont drop 23° C 50%) | JIS K 7211 | J | 300 | 800 | 1000 | 400 | 400 |
| Formation of percolation structure | I.A*3) | — | yes | yes | yes | yes | yes |
| HDT | JIS K 7207 | ° C. | 120 | 131 | 118 | 115 | 128 |
| Adaptability to vacuum forming | | | — | — | — | good | — |
| Appearance of molded product | | | — | — | — | good | — |
| Adaptability to injection molding | | | good | good | good | — | good |
| Appearance of injection-molded product | | | good | good | good | — | good |
| | Measuring method | Unit | Comp. Ex. 1 | Comp. Ex. 2 | Comp. Ex. 3 | Comp. Ex. 4 | Comp. Ex. 5 |
| Type of resin | | | (Q-1-R) | (Q-2-R) | (Q-3-R) | (Q-4-R) | (Q-5-R) |
| MFR of resin | JIS K 7210 | g/10 min | 0.5 | 24.2 | 0.9 | 10.0 | 3.0 |
| Sound velocity (of elastic material charged) | SAM*2) | m/s | 3060 | 2100 | 1800 | 1430 | 1400 |
| IP (%) | MSS | % | 97.8 | 94.0 | 98.0 | 98.0 | 98.9 |
| XI (%) | MSS | % | 95.0 | 80.0 | 77.2 | 85.0 | 78.0 |
| FM (MPa) | JIS K 7201 | Mpa | 110.0 | 1200.0 | 1150.0 | 1300.0 | 1800 |
| Uniaxial impact strength (Izod notched 23° C.) | iso 180 | J/m | 70.0 | 90.0 | 100.0 | 200.0 | 180.0 |
| Uniaxial impact strength (Izod notched −30° C.) | iso 180 | J/m | 30.0 | 30.0 | 31.0 | 37.0 | 38.0 |
| Multi-axial impact strength (Du pont drop 23° C 50%) | JIS K 7211 | J | 80.0 | 90.0 | 70.0 | 70.0 | 100.0 |
| Formation of percolation structure | I.A*3) | — | no | no | no | no | no |
| HDT | JIS K 7207 | ° C. | 98 | 102 | 101 | 108 | 109 |

TABLE 2-continued

| | | | | | |
|---|---|---|---|---|---|
| Adaptability to vacuum forming | Drawdown occurs. | — | Drawdown occurs. | — | — |
| Appearance of molded product | bad | — | bad | — | — |
| Adaptability to injection molding | — | bad | — | bad[1] | bad[1] |
| Appearance of injection-molded product | — | Flow mark occurs. | — | Flow mark occurs. | Flow mark occurs. |

[1] The resin sometimes cannot fully be charged.
[2] Observed with an ultrasonic microscopy.
[3] Measured with an image analyzer.

Figure 1:
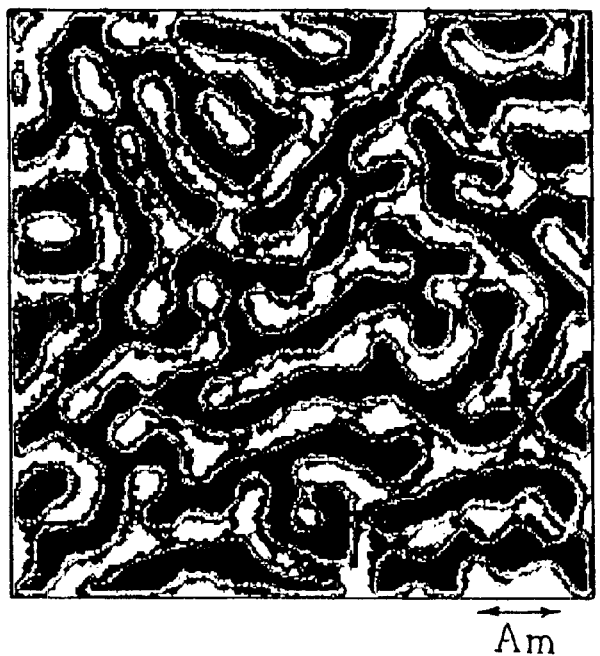
FIG. 1 is a two-dimensional schematic view of a percolation structure.
Figure 2:
FIG. 2 is an acoustic microscopic photograph (dispersion structure) of a polypropylene resin composition obtained in Example 1.
Figure 3:
FIG. 3 shows the results provided by observing the polypropylene resin composition obtained in Example 1 with an acoustic microscope and processing the image (dispersion structure) observed through histogram analysis of reflection intensity.

What is claimed is:

1. A propylene resin composition comprising a propylene resin and an elastic material, the propylene resin being selected from the group consisting of a propylene homopolymer, a copolymer of propylene and an α-olefin having up to 20 carbon atoms and mixtures thereof, wherein the α-olefin content of the copolymer is no greater than 10 mol %, and the elastic material being selected from the group consisting of a copolymer of ethylene and another α-olefin having 3 to 20 carbon atoms, a styrenic elastic material, and mixtures thereof wherein the elastic material is present in the propylene resin composition in an amount from 0.05 to 50 wt. %, and a separated micro phase structure of the elastic material in the composition has a percolation structure in which the phase of elastic material is infinitely continuous in the resin solid space, and has a velocity v of sound propagated as a longitudinal wave being 3,000 m/s or less.

2. The propylene resin composition as claimed in claim 1, wherein the sound velocity v is 2,500 m/s or less.

3. The propylene resin composition according to claim 1, wherein the propylene resin is crystallizable polypropylene, having an isotactic pentad ratio of at least 95.0% as measured by $^{13}$C nuclear magnetic resonance spectroscopy of its xylene extraction insoluble portion.

4. The propylene resin composition according to claim 1, wherein the elastic material is at least one type of an elastic material selected from the group consisting of a styrenic elastomer containing styrene and conjugated diene or its hydrogenated material, an ethylene.α-olefin random copolymer and an ethylene.α-olefin-non-conjugated polyene random copolymer.

* * * * *